(12) United States Patent
Kim et al.

(10) Patent No.: US 11,243,222 B1
(45) Date of Patent: Feb. 8, 2022

(54) METHOD FOR CALCULATING TRUE WIND DIRECTION AND TRUE WIND SPEED BY ADJUSTING MEASURED VALUES OF ANEMOMETER MOUNTED ON MOVING BODY BASED ON OBSERVATION ERRORS CAUSED BY DEGREE OF SLANT OF MOVING BODY AND DEVICE USING THE SAME

(71) Applicant: National Institute of Meteorological Sciences, Seogwipo-si (KR)

(72) Inventors: Geon Tae Kim, Gangneung-si (KR); Seon Jeong Kim, Gangneung-si (KR)

(73) Assignee: National Institute Of Meteorological Sciences

( * ) Notice: Subject to any disclaimer, the term of this patent is extended or adjusted under 35 U.S.C. 154(b) by 0 days.

(21) Appl. No.: 17/393,631

(22) Filed: Aug. 4, 2021

(30) Foreign Application Priority Data

Aug. 5, 2020 (KR) .......................... 10-2020-0098233

(51) Int. Cl.
  *G01P 5/02* (2006.01)
  *G01P 13/00* (2006.01)
(52) U.S. Cl.
  CPC ................ *G01P 5/02* (2013.01); *G01P 13/00* (2013.01)
(58) Field of Classification Search
  CPC .................................... G01P 5/02; G01P 13/00
  USPC ............................................................ 702/3
  See application file for complete search history.

(56) References Cited

U.S. PATENT DOCUMENTS

| 2014/0309864 | A1* | 10/2014 | Ricci | B60N 2/0244 |
| | | | | 701/36 |
| 2020/0284818 | A1* | 9/2020 | Dumont | B61L 15/0072 |
| 2021/0003427 | A1* | 1/2021 | Kim | G01D 11/24 |

FOREIGN PATENT DOCUMENTS

| JP | 62006275 | 1/1987 |
| JP | 09089919 | 4/1997 |
| JP | 11038033 | 2/1999 |
| JP | 2005241441 | 9/2005 |
| KR | 100255742 | 2/1999 |
| KR | 200411154 | 3/2006 |
| KR | 1020100024400 | 3/2010 |

OTHER PUBLICATIONS

Office Action with English Translation relating to copending Korean Application No. 10-2020-0098233; pp. 1-4.

(Continued)

*Primary Examiner* — Aditya S Bhat
(74) *Attorney, Agent, or Firm* — McCarter & English, LLP

(57) ABSTRACT

A method for calculating a true wind direction and a true wind speed by adjusting measured values of an anemometer mounted on a vehicle based on observation errors caused by a degree of slant of the vehicle and a device using the same are provided. The method includes steps of: (I) acquiring a Gt, which is information on the degree of slant corresponding to a current time t, from an electronic compass module, and (II) acquiring a Wmt which is information on a measured wind measured by the anemometer at the current time t, to acquire a Wmt', which is information on a measured corrected wind in a space after a first error correction on the Wmt by referring to the Gt, to thereby calculate a first true wind direction and a first true wind speed.

12 Claims, 9 Drawing Sheets

(56) References Cited

OTHER PUBLICATIONS

Notice of Allowance with English Translation relating to copending Korean Application No. 10-2020-0098233; pp. 1-4.
"A Mobile Meteorological Observation Vehicle?", Skylove of Korea Meteorological Administration (Feb. 2017).

* cited by examiner

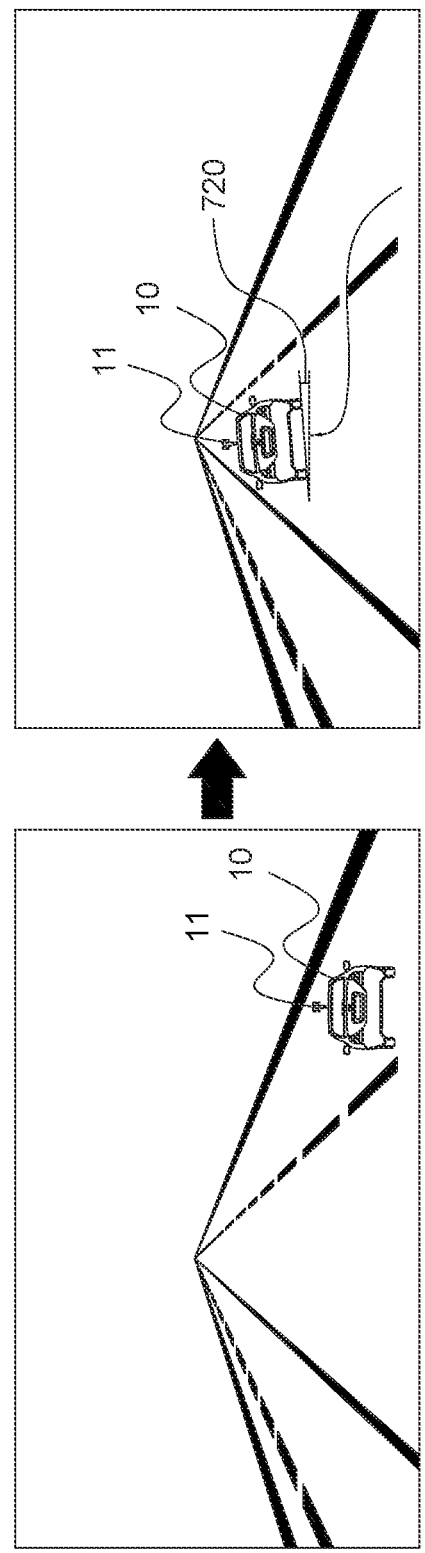

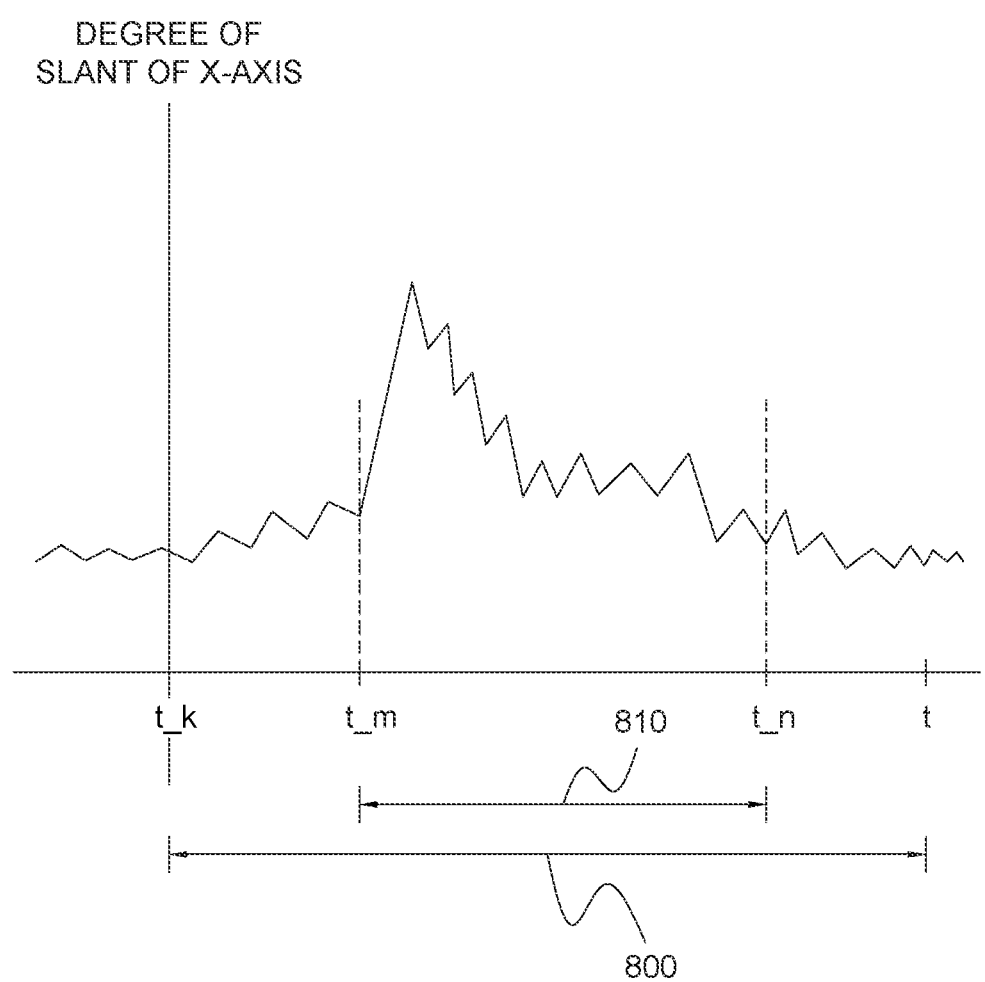

METHOD FOR CALCULATING TRUE WIND DIRECTION AND TRUE WIND SPEED BY ADJUSTING MEASURED VALUES OF ANEMOMETER MOUNTED ON MOVING BODY BASED ON OBSERVATION ERRORS CAUSED BY DEGREE OF SLANT OF MOVING BODY AND DEVICE USING THE SAME

CROSS REFERENCE TO RELATING APPLICATIONS

This application claims the benefit of Korean Patent Application No. 10-2020-0098233, filed Aug. 5, 2020, which is incorporated herein by reference in its entirety.

FIELD OF THE DISCLOSURE

The present disclosure relates to a method for calculating a true wind direction and a true wind speed by adjusting measured values of an anemometer mounted on a moving body, i.e., a vehicle, based on observation errors caused by a degree of slant of the vehicle

BACKGROUND OF THE DISCLOSURE

Recently, along with the continuous developments of industrial technologies, functions and performances of meteorological instruments have also been improved, and accordingly, more accurate meteorological data can be obtained and a vast amount of meteorological data can be stored and analyzed. Nevertheless, since there is a physical limitation as to a range of measurement the meteorological instruments can measure, a void of data due to the physical limitation is inevitable, and it is unrealistic to install the meteorological instruments on every sites where there are voids of data.

Therefore, a method for installing the meteorological instruments on a vehicle was introduced. For example, the meteorological instruments mounted on the vehicle can measure meteorological data at a measuring site and then measure another meteorological data at a next measuring site.

A mobile meteorological vehicle on which various meteorological instruments such as an anemometer, etc. are installed is known in the art. (See, e.g., "A Mobile Meteorological Observation Vehicle?", Skylove of Korea Meteorological Administration (February 2017)). However, an error correcting method is necessary because meteorological instruments in a mobile state have more errors in their collected data than other meteorological instruments in a static state. See id.

Therefore, there is a need to propose a method for improving an accuracy of measured values of the anemometer mounted on the vehicle while being operated.

SUMMARY OF THE DISCLOSURE

It is an object of the present disclosure to solve all of the aforementioned problems.

It is another object of the present disclosure to provide a method for correcting observation errors due to a degree of slant of a vehicle by adjusting reference axes to thereby adjust measured values measured by a true wind direction and true wind speed calculating device.

It is still another object of the present disclosure to determine the degree of slant of the vehicle and accordingly perform additional error adjusting processes.

It is still yet another object of the present disclosure to measure a change in the degree of slant for each of the reference axes, to thereby eliminate or replace measured values whose changes are equal to or larger than a specific threshold.

In order to achieve the above objects and achieve the desired results that will be introduced hereinafter, the configuration of the present disclosure is as follows:

In accordance with one aspect of the present disclosure, there is provided a method for calculating a true wind direction and a true wind speed by adjusting measured values of an anemometer mounted on a vehicle based on observation errors caused by a degree of slant of the vehicle, including steps of: (a) a true wind direction and true wind speed calculating device on which an electronic compass module is mounted, wherein the electronic compass module is dependent on a degree of horizontality of the anemometer, and wherein the degree of horizontality is changed according to the degree of slant of the vehicle, performing a process of (I) acquiring a Gt, which is information on the degree of slant corresponding to a current time t, from the electronic compass module, wherein the Gt includes: (i) information on an angle $\theta xt$ which is an angle of a Zt-axis being rotated from a Z-axis toward an X-axis and (ii) information on an angle $\theta Yt$ which is an angle of the Zt-axis being rotated from the Z-axis toward a Y-axis, wherein the Z-axis is an axis along which gravity acts on the vehicle, wherein the X-axis and the Y-axis included in an XY plane are respectively related to a first direction and a second direction, the XY plane containing current coordinates of a predetermined reference point of the vehicle, and wherein the Zt-axis corresponds to a vertical axis of the anemometer, and (II) acquiring a Wmt which is information on a measured wind measured by the anemometer at the current time t, wherein the Wmt includes measured values of the Zt-axis, an Xt-axis and a Yt-axis, wherein the Xt-axis in a third direction and the Yt-axis in a fourth direction forms an XtYt plane, and wherein the XtYt plane is perpendicular to the Zt-axis and includes the current coordinates of the vehicle; and (b) the true wind direction and true wind speed calculating device performing a process of acquiring a Wmt', which is information on a measured corrected wind in a space formed by the X-axis, the Y-axis, and the Z-axis after a first error correction on the Wmt by referring to the Gt, to thereby calculate a first true wind direction and a first true wind speed.

As one example, the true wind direction and true wind speed calculating device includes a vehicle location module capable of acquiring information on the current coordinates of the vehicle, and based thereon, acquiring information on a speed of the vehicle, an acceleration of the vehicle, and a direction of the vehicle, and wherein, after the step of (b), the method further comprises steps of: (c) the true wind direction and true wind speed calculating device performing a process of determining whether the vehicle is moving by referring to at least one of the electronic compass module and the vehicle location module, wherein the electronic compass module contains an accelerometer capable of measuring a change in the acceleration of the vehicle; and (d) (1) in response to a determination that the vehicle is moving, the true wind direction and true wind speed calculating device performing a process of (i) (i–1) acquiring a piece of first vehicle information including (i–1–a) information on the speed of the vehicle, the acceleration of the vehicle and a true north of the vehicle, from the vehicle location module, and (i-1-b) information on a heading of the vehicle, from the electronic compass module, and (i-2) acquiring a Wct, which is information on a relative wind caused by the vehicle moving, based on the first vehicle information, (ii) calculating a Wct', which is information on a corrected relative wind in the space formed by the X-axis, the Y-axis, and the Z-axis after a second error correction on the Wct by referring to the Gt, and (iii) acquiring a first Wot, which is information on an original wind in the space formed by the X-axis, the Y-axis, and the Z-axis by referring to the first vehicle information, the Wmt', and the Wct', to thereby calculate a (2-1)-st true wind direction and a (2-1)-st true wind speed, (2) in response to a determination that the vehicle is not moving, the true wind direction and true wind speed calculating device performing a process of (i) acquiring a piece of second vehicle information, including information on the true north of the vehicle and the heading of the vehicle, from the electronic compass module, and (ii) acquiring a second Wot, which is information on an original wind in the space formed by the X-axis, the Y-axis, and the Z-axis by referring to the second vehicle information and the Wmt', to thereby calculate a (2-2)-nd true wind direction and a (2-2)-nd true wind speed, and (3) acquiring the true wind direction and the true wind speed on which a determination as to whether the vehicle is moving is additionally reflected by referring to the (2-1)-st true wind direction and the (2-1)-st true wind speed and the (2-2)-nd true wind direction and the (2-2)-nd true wind speed.

As one example, the true wind direction and true wind speed calculating device calculates the (2-1)-st true wind direction and the (2-1)-st true wind speed or the (2-2)-nd true wind direction and the (2-2)-nd true wind speed at every predetermined measurement interval, and performing an integrated operation on the (2-1)-st true wind direction and the (2-1)-st true wind speed or the (2-2)-nd true wind direction and the (2-2)-nd true wind speed, to thereby acquire a final true wind direction and a final true wind speed as corresponding to an accumulated measurement time.

As one example, at the step of (d), in response to the determination that the vehicle is moving, (d1) the true wind direction and true wind speed calculating device performs a process of acquiring information on each change in the degree of slant for each of the X-axis, the Y-axis, and the Z-axis from the electronic compass module for a time period from a past time t_k to the current time t which corresponds to the accumulated measurement time, and (d2) in response to a detection on (i) a specific change in the degree of slant that is equal to or larger than a first threshold at a past time t_m, which is a time after the past time t_k, and then (ii) the specific change in the degree of slant is restored at a past time t_n, the true wind direction and true wind speed calculating device performs a process of classifying the first Wot, which are a Wot_m to a Wot_n measured during the past time t_m to the past time t_n at said every predetermined measurement interval as erroneous values, to thereby acquire the final true wind direction and the final true wind speed after eliminating the erroneous values or after replacing the erroneous values with normal measured values measured right before or after thereof.

As one example, at the step of (d), in response to the determination that the vehicle is moving, (d1) the true wind direction and true wind speed calculating device performs a process of acquiring information on each change in the degree of slant for each of the X-axis, the Y-axis, and the Z-axis from the electronic compass module for a time period from a past time t_k to the current time t which corresponds to the accumulated measurement time, and (d2) in response to a detection on (i) a specific change in the degree of slant that is equal to or larger than a first threshold at the past time t_k, and then (ii) the specific change in the degree of slant is preserved until the current time t, the true wind direction and true wind speed calculating device performs a process of classifying a Wot_(k-p), . . . , a Wot(k-1), Wot_k, a Wot_(k+1), . . . , a Wot(k+q) measured during an offsetting range from a past time t_(k-p) to a past time t_(k+q) as erroneous values, to thereby acquire the final true wind direction and the final true wind speed after eliminating the erroneous values or replacing the erroneous values with normal measured values measured right before or after thereof.

As one example, in response to a detection on a cardinal number of specific erroneous values whose corresponding changes in the degree of slant being equal to or larger than a second threshold to be more than a predetermined percentage of a cardinal number of specific measured values measured at said every predetermined measurement interval during a specific accumulated measurement time, the true wind direction and true wind speed calculating device performs a process of classifying the specific measured values as the erroneous values, to thereby acquire the final true wind direction and the final true wind speed after eliminating the erroneous values or replacing the erroneous values with normal measured values measured right before or after thereof.

In accordance with another aspect of the present disclosure, there is provided a true wind direction and true wind speed calculating device for calculating a true wind direction and a true wind speed by adjusting measured values of an anemometer mounted on a vehicle based on observation errors caused by a degree of slant of the vehicle, wherein the true wind direction and true wind speed calculating device includes an electronic compass module mounted thereon, wherein the electronic compass module is dependent on a degree of horizontality of the anemometer, and wherein the degree of horizontality is changed according to the degree of slant of the vehicle, including: at least one memory that stores instructions; and at least one processor configured to execute the instructions to perform: (I) a process of (i) acquiring a Gt, which is information on the degree of slant corresponding to a current time t, from the electronic compass module, wherein the Gt includes: (i-1) information on an angle θxt which is an angle of a Zt-axis being rotated from a Z-axis toward an X-axis and (i-2) information on an angle θYt which is an angle of the Zt-axis being rotated from the Z-axis toward a Y-axis, wherein the Z-axis is an axis along which gravity acts on the vehicle, wherein the X-axis and the Y-axis included in an XY plane are respectively related to a first direction and a second direction, the XY plane containing current coordinates of a predetermined reference point of the vehicle, and wherein the Zt-axis corresponds to a vertical axis of the anemometer, and (ii) acquiring a Wmt which is information on a measured wind measured by the anemometer at the current time t, wherein the Wmt includes measured values of the Zt-axis, an Xt-axis and a Yt-axis, wherein the Xt-axis in a third direction and the Yt-axis in a fourth direction forms an XtYt plane, and wherein the XtYt plane is perpendicular to the Zt-axis and includes the current coordinates of the vehicle; and (II) a process of acquiring a Wmt', which is information on a measured corrected wind in a space formed by the X-axis, the Y-axis, and the Z-axis after a first error correction on the Wmt by referring to the Gt, to thereby calculate a first true wind direction and a first true wind speed.

As one example, the true wind direction and true wind speed calculating device includes a vehicle location module capable of acquiring information on the current coordinates of the vehicle, and based thereon, acquiring information on a speed of the vehicle, an acceleration of the vehicle, and a direction of the vehicle, wherein, after the process of (II), the processor further performs: (III) a process of determining whether the vehicle is moving by referring to at least one of the electronic compass module and the vehicle location module, wherein the electronic compass module contains an accelerometer capable of measuring a change in the acceleration of the vehicle; and (IV) (1) in response to a determination that the vehicle is moving, a process of (i) (i-1) acquiring a piece of first vehicle information including (i-1-a) information on the speed of the vehicle, the acceleration of the vehicle and a true north of the vehicle, from the vehicle location module, and (i-1-b) information on a heading of the vehicle, from the electronic compass module, and (i-2) acquiring a Wct, which is information on a relative wind caused by the vehicle moving, based on the first vehicle information, (ii) calculating a Wct', which is information on a corrected relative wind in the space formed by the X-axis, the Y-axis, and the Z-axis after a second error correction on the Wct by referring to the Gt, and (iii) acquiring a first Wot, which is information on an original wind in the space formed by the X-axis, the Y-axis, and the Z-axis by referring to the first vehicle information, the Wmt', and the Wct', to thereby calculate a (2-1)-st true wind direction and a (2-1)-st true wind speed, (2) in response to a determination that the vehicle is not moving, a process of (i) acquiring a piece of second vehicle information, including information on the true north of the vehicle and the heading of the vehicle, from the electronic compass module, and (ii) acquiring a second Wot, which is information on an original wind in the space formed by the X-axis, the Y-axis, and the Z-axis by referring to the second vehicle information and the Wmt', to thereby calculate a (2-2)-nd true wind direction and a (2-2)-nd true wind speed, and (3) a process of acquiring the true wind direction and the true wind speed on which a determination as to whether the vehicle is moving is additionally reflected by referring to the (2-1)-st true wind direction and the (2-1)-st true wind speed and the (2-2)-nd true wind direction and the (2-2)-nd true wind speed.

As one example, the processor performs a process of calculating the (2-1)-st true wind direction and the (2-1)-st true wind speed or the (2-2)-nd true wind direction and the (2-2)-nd true wind speed, and applying an integrated operation to the (2-1)-st true wind direction and the (2-1)-st true wind speed or the (2-2)-nd true wind direction and the (2-2)-nd true wind speed, to thereby acquire a final true wind direction and a final true wind speed as corresponding to an accumulated measurement time.

As one example, at the process of (IV), in response to the determination that the vehicle is moving, the processor performs: (IV-1) a process of acquiring information on each change in the degree of slant for each of the X-axis, the Y-axis, and the Z-axis from the electronic compass module for a time period from a past time t_k to the current time t which corresponds to the accumulated measurement time, and (IV-2) in response to a detection on (i) a specific change in the degree of slant that is equal to or larger than a first threshold at a past time t_m, which is a time after the past time t_k, and then (ii) the specific change in the degree of slant is restored at a past time t_n, a process of classifying the first Wot, which are Wot_m to a Wot_n measured during the past time t_m to the past time t_n at said every predetermined measurement interval as erroneous values, to thereby acquire the final true wind direction and the final true wind speed after eliminating the erroneous values or after replacing the erroneous values with normal measured values measured right before or after thereof.

As one example, wherein at the process of (IV), in response to the determination that the vehicle is moving, the processor performs: (IV-1) a process of acquiring information on each change in the degree of slant for each of the X-axis, the Y-axis, and the Z-axis from the electronic compass module for a time period from a past time t_k to the current time t which corresponds to the accumulated measurement time, and (IV-2) in response to a detection on (i) a specific change in the degree of slant that is equal to or larger than a first threshold at the past time t_k, and then (ii) the specific change in the degree of slant is preserved until the current time t, a process of classifying a Wot_(k-p), . . . , a Wot(k-1), Wot_k, a Wot_(k+1), a Wot(k+q) measured during an offsetting range from a past time t_(k-p) to a past time t_(k+q) as erroneous values, to thereby acquire the final true wind direction and the final true wind speed after eliminating the erroneous values or replacing the erroneous values with a normal measured values measured right before or after thereof.

As one example, in response to a detection on a cardinal number of specific erroneous values whose corresponding changes in the degree of slant being equal to or larger than a second threshold to be more than a predetermined percentage of a cardinal number of specific measured values measured at said every predetermined measurement interval during a specific accumulated measurement time, further performs a process of classifying the specific measured values as the erroneous values, to thereby acquire the final true wind direction and the final true wind speed after eliminating the erroneous values or replacing the erroneous values with a normal measured values measured right before or after thereof.

BRIEF DESCRIPTION OF THE DRAWINGS

The above and other objects and features of the present disclosure will become apparent from the following description of preferred embodiments given in conjunction with the accompanying drawings. The accompanying drawings used to explain example embodiments of the present disclosure are only part of example embodiments of the present disclosure and other drawings can be obtained based on the drawings by those skilled in the art of the present disclosure without inventive work.

FIG. 6B is a drawing illustrating a change in the degree of slant of the vehicle due to a sudden change in a path of the vehicle in accordance with one example embodiment of the present disclosure.

FIG. 7A is a graph illustrating, for at least one of the reference axes, a section of a change and a restoration in the degree of slant, to be used for determining the measured values in the section as erroneous values in accordance with one example embodiment of the present disclosure.

DETAILED DESCRIPTION OF THE PREFERRED EMBODIMENTS

Figure 1:
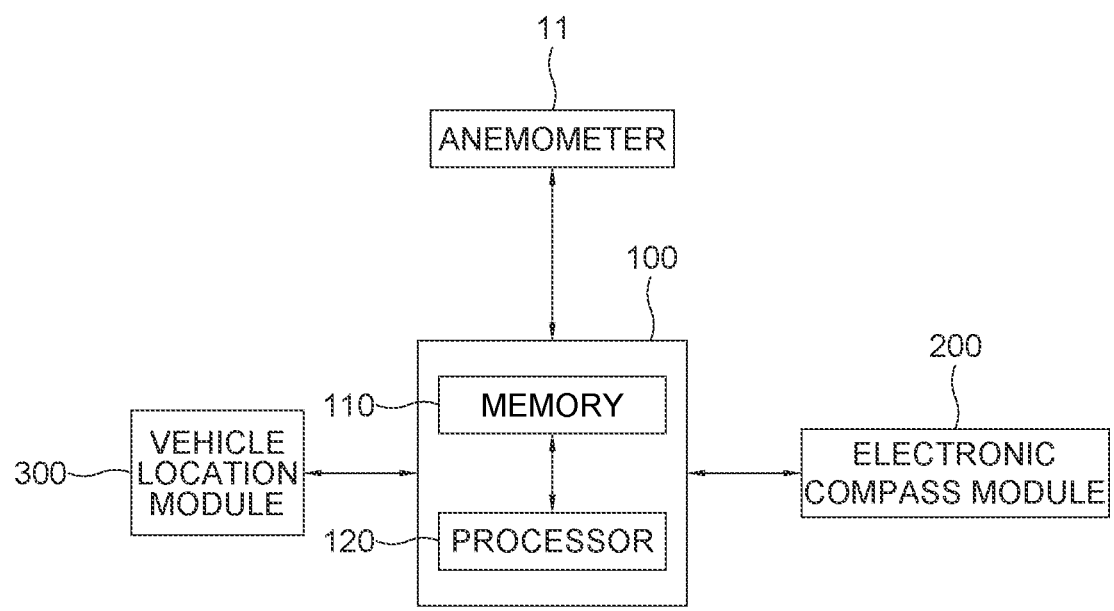
FIG. 1 is a drawing schematically illustrating a true wind direction and true wind speed calculating device for calculating a true wind direction and a true wind speed by adjusting observation errors due to a degree of slant of a vehicle in accordance with one example embodiment of the present disclosure.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to carry out the present invention easily, the example embodiments of the present invention by referring to attached diagrams will be explained in detail as shown below.

FIG. 1 is a drawing schematically illustrating a true wind direction and true wind speed calculating device for calculating a true wind direction and a true wind speed by adjusting observation errors due to a degree of slant of a vehicle in accordance with one example embodiment of the present disclosure.

For reference, the term "slant" as used herein not only represents angles formed by the vehicle from reference axes but also changes in a posture of the vehicle, i.e., changes in a pitch, a roll and a yaw, according to the movement of the vehicle.

Referring to FIG. 1, the true wind direction and true wind speed calculating device 100 for calculating the true wind direction and the true wind speed by adjusting the observations errors due to the degree of slant of the vehicle may include a memory 110 and a processor 120. Herein, the memory 110 may store instructions of the processor 120, wherein the instructions are specifically codes generated for the purpose of allowing the true wind direction and true wind speed calculating device to function in a specific manner, and can be implemented in a form of executable program command through a variety of computer means recordable to computer readable media. The instructions may execute processes for performing functions described herein.

Additionally, the processor 120 of the true wind direction and true wind speed calculating device 100 may include hardware configurations such as an MPU (Micro Processing Unit) or a CPU (Central Processing Unit), cache memory, and data bus, etc. It may further include an operating system, and software that perform specific functions.

The present disclosure does not exclude a configuration of an integrated processor, which is a structure in which both the processor 120 and the memory 110 are integrated together as a medium for operation.

First, the true wind direction and true wind speed calculating device 100 may include an anemometer 11 mounted thereon and capable of measuring a wind to acquire a wind direction and a wind speed. Herein, the anemometer 11 may conduct measurements in varying environments depending on a three-dimensional movement of the vehicle, therefore, an ultrasonic anemometer capable of measuring the three-dimensional movement may be used in lieu of a conventional propeller-vane anemometer that is only capable of measuring a two-dimensional movement.

Also, the true wind direction and true wind speed calculating device 100 may include an electronic compass module 200 for acquiring information on the degree of slant of the vehicle. Herein, the degree of slant may change depending on a slope of a ground level the vehicle is located or depending on a change in a posture of the vehicle. Therefore, a degree of horizontality on the electronic compass module 200 may be changed accordingly. Herein the degree of horizontality is changed according to the degree of slant of the vehicle. Additionally, the electronic compass module 200 may include a geomagnetic sensor, an accelerometer, and a gyro sensor in order to acquire information on a change in the degree of slant of the vehicle, and information on a direction such as a true north, and information on a heading of the vehicle.

Also, the true wind direction and true wind speed calculating device 100 may be interworked with a vehicle location module 300 capable of acquiring a current coordinates of the vehicle 10, and based thereon, acquiring information on a speed of the vehicle, an acceleration of the vehicle, the direction of the vehicle, and the true north of the vehicle in order to eliminate errors in the measured values of the electronic compass module 200 that may occur when the vehicle is moving. Herein, the vehicle location module 300 can be a GPS module or type of GNSS module that can perform similar required functions.

Since the true wind direction and true wind speed calculating device 100 as described above, mounted on the vehicle 10, is specialized for conducting measurements in the varying environments instead of conducting measurements in constant environments, a process of correcting erroneous values acquired due to the varying environments should be performed by reflecting a difference between the measured values from the varying environments and those from the constant environments, which will be explained below.

Figure 2:
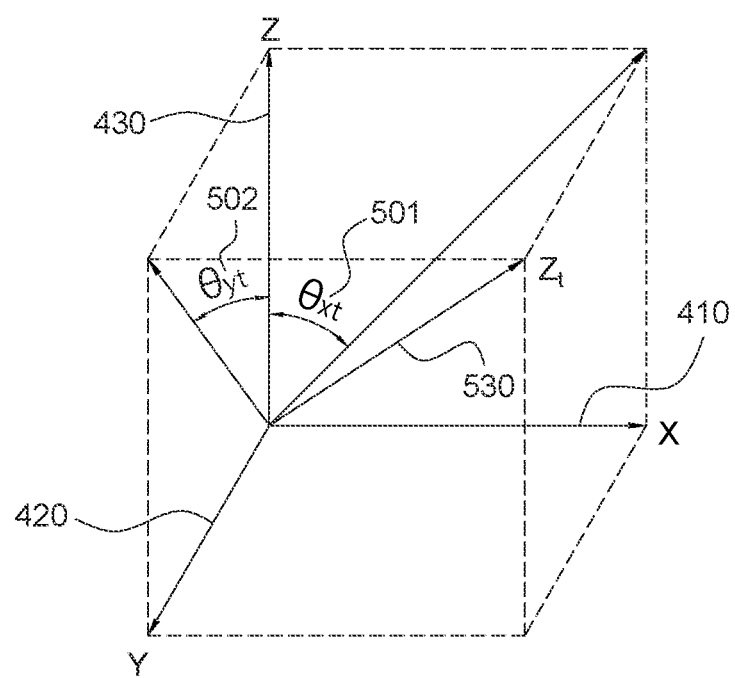
FIG. 2 is a drawing schematically illustrating a concept of a space for correcting reference axes according to the degree of slant of the vehicle in accordance with one example embodiment of the present disclosure.

FIG. 2 is a drawing schematically illustrating a concept of a space for correcting the reference axes according to the degree of slant of the vehicle in accordance with one example embodiment of the present disclosure.

Referring to FIG. 2, the true wind direction and wind speed calculating device 100 may correct the reference axes in order to adjust the observation errors due to the degree of slant of the vehicle.

Specifically, the true wind direction and true wind speed calculating device 100 can perform a process of acquiring a Gt, which is information on the degree of slant corresponding to a current time t. Herein, the Gt includes (i) information on an angle θxt 501 which is an angle of a Zt-axis 530 being rotated from a Z-axis 430 toward an X-axis 410 and (ii) information on an angle θYt 502 which is an angle of the Zt-axis 530 being rotated from the Z-axis 430 toward a Y-axis 420. Herein, the Z-axis 430 is an axis along which gravity acts on the vehicle, the X-axis 410 and the Y-axis 420 included in an XY plane are respectively related to a first direction and a second direction, the XY plane containing current coordinates of a predetermined reference point of the vehicle, and the Zt-axis corresponds to a vertical axis of the anemometer 11. That is, the angle θxt 501 is an angle formed when the vehicle rotates with the Y-axis 420 serving as a rotation axis, and the angle θYt 502 is an angle formed when the vehicle rotates with the X-axis 410 serving as the rotation axis, and based thereon, an angle from the Zt-axis 530 and the Z-axis 430 can also be calculated. However, the angle from the Zt-axis 530 and the Z-axis 430 is different from an angle θZt (not illustrated), which is an angle formed when the vehicle rotates with the Z-axis serving the rotation axis, therefore, it is not illustrated. (θZt corresponds to a yaw of the vehicle 10).

Subsequently, the true wind direction and true wind speed calculating device 100 may perform a process of acquiring a Wmt which is information on a measured wind measured by the anemometer 11 at the current time t. Herein, the Wmt may include measured values corresponding to Zt-axis 530, an Xt-axis (not shown) and a Yt-axis (not shown). Herein, the Xt-axis in a third direction and the Yt-axis in a fourth direction form an XtYt plane which includes current coordinates of the vehicle and is perpendicular to the Zt-axis 530.

For reference, the Xt-axis, the Yt-axis and the XtYt plane is perpendicular to the Zt-axis 530, and for clarity, FIG. 2 illustrates the Zt-axis 530 only.

Also, if the first direction of the X-axis 410 and the second direction of the Y-axis 420 are different from the third direction of the Xt-axis and the fourth direction of the Y-axis respectively but correspond to the third direction of the Xt-axis and the fourth direction of the Y-axis respectively, there should be additional computations to reflect differences therebetween on a calculation of a first error correction that will be mentioned hereinafter, however, if the first direction and the third direction are set to be equal and the second direction and the fourth direction are set to be equal, the additional computations may be omitted. That is, whether the additional computations are required depends on the operating conditions of the present disclosure.

Subsequently, the true wind direction and true wind speed calculating device 100 refers to the Gt to perform the first error correction on the Wmt, to thereby acquire a Wmt' which is information on the corrected measured wind in a space formed by the X-axis 410, the Y-axis 420, and the Z-axis 430, and based thereon calculates a first true wind direction and a first true wind speed on which the degree of slant of the vehicle 10 is reflected.

That is, the true wind direction and true wind speed calculating device may correct the measured values from the anemometer 11 mounted on the vehicle 10 with the degree of slant along the Zt-axis by referring to the angle θxt 501 corresponding to a rotational angle of Y-axis 420 and the angle θYt 502 corresponding to the rotational angle of X-axis 410, to thereby perform the first error correction and thus acquire corrected measured values serving as values measured in the space based on the Z-axis which is the axis along which gravity acts on the vehicle.

Figure 3:
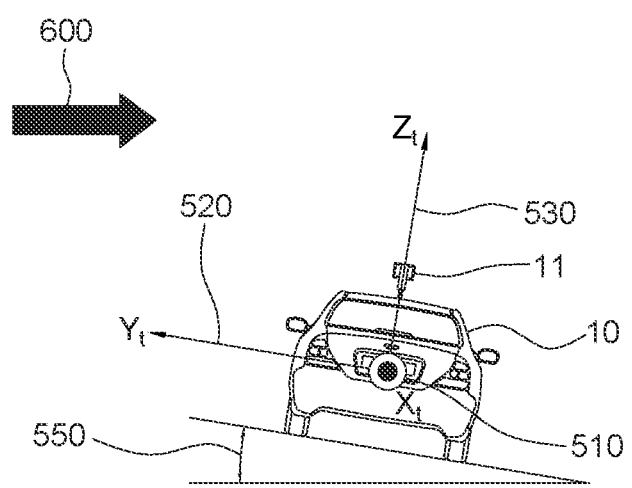
FIG. 3 is a drawing schematically illustrating a change in measured values depending on a slope of a ground level where the vehicle is located in accordance with one example embodiment of the present disclosure.

FIG. 3 is a drawing schematically illustrating a change in the measured values depending on the slope of the ground level where the vehicle is located in accordance with one example embodiment of the present disclosure.

Referring to FIG. 3, the first error correction as described above can be performed as follows.

FIG. 3 illustrates the vehicle 10 with the degree of slant, e.g., 10 degrees 550 from a horizontal plane, in a space formed by the Xt-axis 510 which points outward from a front of the vehicle 10, the Yt-axis 520 which points outward from a left of the vehicle 10, and the Zt-axis 530, which is perpendicular to the Xt-axis 510 and the Yt-axis 520. Herein, in case the wind 600 is blowing from the left of the vehicle 10 parallel to the horizontal plane, an angle of the wind is 0 degree if based on the Z-axis which is perpendicular to the horizontal plane, however, an axis of reference should be based on the Zt-axis, which is the vertical axis of the anemometer 11 mounted on the vehicle 10, thus, the angle of the wind is −10 degrees. Therefore, by performing the process of the first error correction capable of correcting the Zt-axis 530 by the angle θYt (10 degrees), i.e., adding 10 degrees to the angle of the wind, i.e., −10 degrees, a correct angel of 0 degree of the true wind direction based on the Z-axis (vertical axis) can be acquired.

Further, as another example embodiment of the present disclosure, the anemometer 11 can determine whether the vehicle 10 is moving, to thereby acquire the true wind direction and the true wind speed.

The true wind direction and true wind speed calculating device 100 includes a vehicle location module 300 capable of acquiring information on the current coordinates of the vehicle, and based thereon, acquiring information on a speed of the vehicle, an acceleration of the vehicle, and a direction of the vehicle, and can determine whether the vehicle 10 is moving by referring to at least one of the electronic compass module 200 or the vehicle location module 300. For example, the true wind direction and true wind speed calculating device 100 can determine whether the vehicle 10 is moving by referring to changes in accelerations from the accelerometer included in the electronic compass module 200, or referring to the changes in locations from the vehicle location module 300.

Afterwards, (1) in response to a determination that the vehicle 10 is moving, the true wind direction and true wind speed calculating device performs a process of (i) (i−1) acquiring first vehicle information, including information on the speed of the vehicle, the acceleration of the vehicle and a true north of the vehicle, from the vehicle location module, and (i−2) acquiring a Wct, which is information on a relative wind caused by the movement of the vehicle, based on the first vehicle information, (ii) calculating a Wct', which is information on a corrected relative wind in the space formed by the X-axis 410, the Y-axis 420, and the Z-axis 430 after a second error correction on the Wct by referring to the Gt, and (iii) acquiring a first Wot, which is information on an original wind in the space formed by the X-axis 410, the Y-axis 420, and the Z-axis 430 by referring to the first vehicle information, the Wmt', and the Wct', to thereby calculate a (2-1)-st true wind direction and a (2-1)-st true wind speed.

Figure 4:
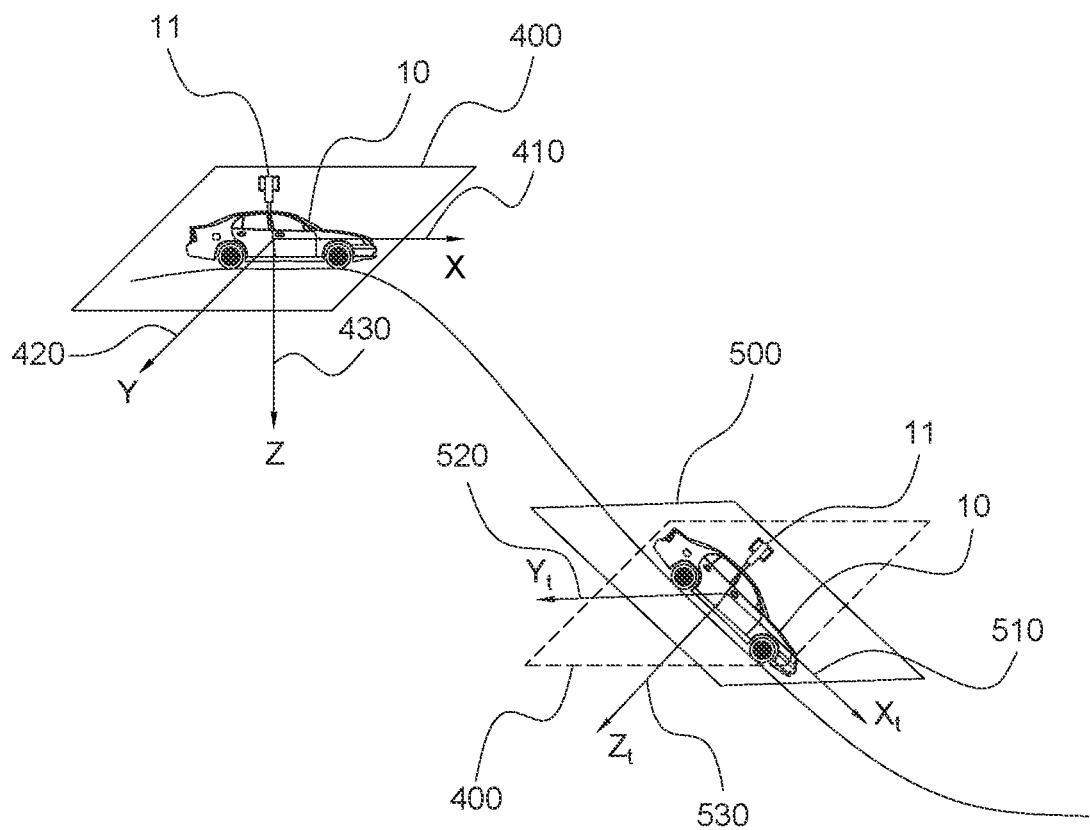
FIG. 4 is a drawing illustrating changes in the reference axes due to a change in the slope of the ground level, and changes in the space due thereto in accordance with one example embodiment of the present disclosure.

FIG. 4 is a drawing illustrating changes in the reference axes of the vehicle due to a change in the slope of the ground level, and changes in the space due thereto in accordance with one example embodiment of the present disclosure.

Referring to FIG. 4, the anemometer 11 mounted on the vehicle 10 moving in a horizontal state, as depicted on the left side of the FIG. 4, may measure the wind direction and the wind speed in a space defined by the Z-axis 430 and the XY plane including a reference point of the vehicle 10. However, even when the anemometer 11 is measuring a same wind, if the anemometer 11 mounted on the vehicle 10 is moving down a slope as depicted on the right side of the FIG. 4, the vertical axis of the anemometer 11, which is the Zt-axis 530, becomes out of line from the axis along which gravity is acting on the vehicle 10, therefore differences may occur to the measured values of the anemometer 11 under the space defined by the Zt-axis 530 and the XtYt plane 500 and the measured values of the anemometer 11 under the space defined by the Z-axis 430 and the XY plane 400. Therefore, to correct such differences, the first error correction may be performed as mentioned hereinbefore, however, if the vehicle 10 is moving, the anemometer 11 should take a relative wind into account.

Figure 5:
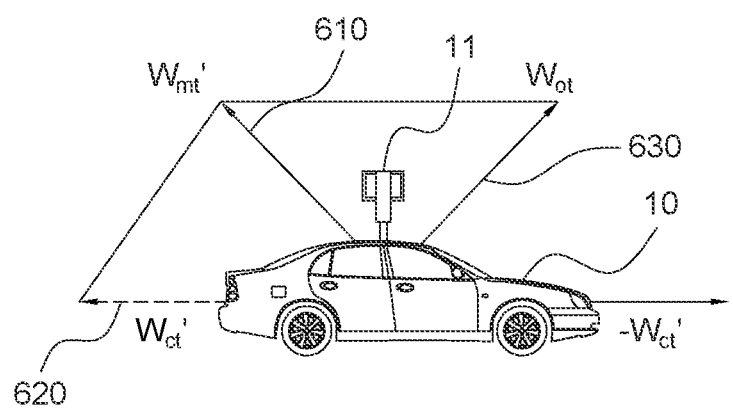
FIG. 5 is a drawing illustrating a deviation of the measured values from a true wind direction and a true wind speed due to a relative wind caused by the vehicle in accordance with one example embodiment of the present disclosure.

FIG. 5 is a drawing illustrating a deviation of the measured values from the true wind direction and the true wind speed due to the relative wind caused by the vehicle in accordance with one example embodiment of the present disclosure.

Referring to FIG. 5, the true wind direction and true wind speed calculating device 100 acquires (i) first vehicle information, including information on the speed of the vehicle, the acceleration of the vehicle and a true north of the vehicle, from the vehicle location module 300, and acquires a Wct, which is information on a relative wind caused by the movement of the vehicle, based on the first vehicle information, (ii) calculates a Wct', which is information on a corrected relative wind in the space formed by the X-axis 410, the Y-axis 420, and the Z-axis 430 after a second error correction on the Wct by referring to the Gt, and (iii) acquires a first Wot 630, which is information on an original wind in the space formed by the X-axis 410, the Y-axis 420, and the Z-axis 430 by referring to the first vehicle information, the Wmt' 610, and the Wct' 620, to thereby calculate a (2-1)-st true wind direction and a (2-1)-st true wind speed.

Herein, each wind information can be expressed by the following equations.

$$\sqrt{Wmt'} = \sqrt{Wot'} + \sqrt{Wct'} \quad \text{Equation 1}$$

Additionally, in accordance with another example embodiment of the present disclosure, if P is the measured values measured by the anemometer 11 corresponding to $\sqrt{Wmt'}$, C is a speed of the vehicle 10 corresponding to $-\sqrt{Wct'}$, T is the original wind corresponding to $\sqrt{Wot'}$, and A is an apparent wind felt from the vehicle 10, with small case dir standing for direction, and small case spd standing for speed, the true wind direction $T_{dir}$ and the true wind speed $T_{spd}$ corresponding to the $\sqrt{Wot}$ can be expressed as following equations.

$$A_{dir} = P_{dir} + C_{dir} + 180° \quad \text{Equation 2}$$

$$T_u = P_{spd} \times \cos(A_{dir}) + C_{spd} \times \cos(C_{dir})$$

$$T_v = P_{spd} \times \sin(A_{dir}) + C_{spd} \times \sin(C_{dir}) \quad \text{Equation 3}$$

$$T_{spd} = (T_u^2 + T_v^2)^{1/2}$$

$$T_{dir} = (\arctan(T_v/T_u)) + 180° \quad \text{Equations 4}$$

Besides, (2) in response to a determination that the vehicle is not moving, the true wind direction and true wind speed calculating device 100 performs a process of (i) acquiring second vehicle information, including information on the true north of the vehicle and the heading of the vehicle, from the electronic compass module 200, and (ii) acquiring a second Wot, which is information on an original wind in the space formed by the X-axis 410, the Y-axis 420, and the Z-axis 430 by referring to the second vehicle information and the Wmt', to thereby calculate a (2-2)-nd true wind direction and a (2-2)-nd true wind speed.

For example, by referring back to FIG. 3, if the vehicle 10 is stopped as depicted in FIG. 3 with the degree of slant as 10 degrees, with the heading of the vehicle 10 defined as pointing outward from the front of the vehicle 10, and the true north defined as pointing outward from the left of the vehicle 10 (same as the direction of the wind 600), a direction of initial measurement values of anemometer 11 with reference to XtYt plane and Zt-axis is −90 degrees (west wind), and −10 degrees respectively. Based thereon, the true wind direction and true wind speed calculating device 100 performs the first error correction which reflects the angle θYt which is 10 degrees, to thereby calculate the true direction of 0 degree with reference to the Z-axis 430.

Further, the true wind direction and true wind speed calculating device 100 reflects the heading of the vehicle 10 which is oriented 90 degrees eastward from the true north of the XY plane, and as a result of performing the second error correction, the true wind direction has a direction of 90+(−90)=0 degree in the XY plane.

Next, in accordance with another example embodiment of the present disclosure, the true wind direction and true wind speed calculating device 100 calculates the (2-1)-st true wind direction and the (2-1)-st true wind speed or the (2-2)-nd true wind direction and the (2-2)-nd true wind speed at every predetermined measurement interval (e.g. 1 second) and performs an integrated operation on the (2-1)-st true wind direction and the (2-1)-st true wind speed or the (2-2)-nd true wind direction and the (2-2)-nd true wind speed, to thereby acquire a final true wind direction and a final true wind speed as corresponding to an accumulated measurement time of (e.g. 10 minutes).

Herein, the integrated operation is an operation that calculates one single value by integrating 600 pieces of measured wind information measured at said every one-second interval, which is a measurement interval unit, during the accumulated measurement time of 10 minutes, and it can simply be an operation to calculate an average, however, depending on an implementation of the present invention, the integrated operation may be applied differently, such as assigning weights by referring to a variance of the measured values.

Furthermore, as another example, if a change in the degree of slant occurs with respect to at least one of the X-axis 410, the Y-axis 420, and the Z-axis 430 on the premise that the integrated operation described above is performed, there may be additional processes such as classifying at least a portion of the measured values as the erroneous values or replacing thereof after analyzing the measured values.

In general, since road surfaces on which the vehicle 10 travels on have gradual changes, the possibility of a sudden change in the slope is low. However, because the vehicle 10 is designed for moving, there may be changes in the posture thereof, e.g., at least the roll, the pitch and the yaw. Accordingly, additional errors occur due to noises generated in the measured values.

Figure 6A:
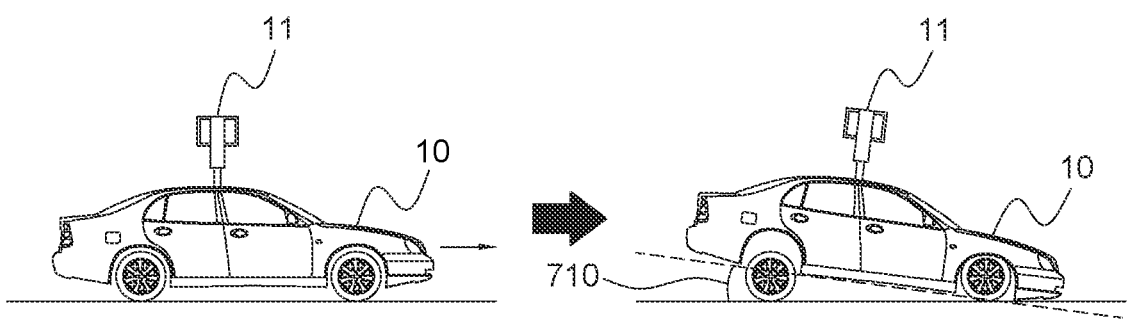
FIG. 6A is a drawing illustrating a change in the degree of slant of the vehicle due to a sharp decrease in speed of the vehicle (a sudden stop) in accordance with one example embodiment of the present disclosure.

FIG. 6A is a drawing illustrating a change in the degree of slant (a change 710 in the pitch) of the vehicle due to a sharp decrease in speed of the vehicle (a sudden stop) in accordance with one example embodiment of the present disclosure.

FIG. 6B is a drawing illustrating a change in the degree of slant (a change 720 in the roll) of the vehicle due to a sudden change in a path of the vehicle in accordance with one example embodiment of the present disclosure.

Further, though not illustrated, if the vehicle 10 is making a left/right turn or a U-turn, the change in the yaw of the vehicle 10 may cause a change in the pitch and/or the roll together.

As described above, the change in the degree of slant due to the posture thereof, albeit temporary and fleeting, can affect the anemometer 11 negatively.

FIG. 7A is a graph illustrating, for at least one of the reference axes, a section of a change and a restoration in the degree of slant for a duration shorter than an accumulated measurement time, to be used for determining the measured values in the section as the erroneous values in accordance with one example embodiment of the present disclosure.

Referring to FIG. 7A, the degree of slant of the vehicle 10 can be observed with reference to the X-axis 430, the change in the degree of slant happened at a past time t_m before the current time t and continued for a certain period of time 810 until a past time t_n where the degree of slant was restored. Herein, if the accumulated measurement time is assumed to be a duration 800 (e.g. 10 minutes) from a past time t_k to the current time t, since the certain period of time 810 when the change in the degree of slant happened was less than the accumulated measurement time, it may be determined that the change in the degree of slant was due to the movement of the vehicle 10 itself. Thus, the measured values of the original wind of a Wot_m to a Wot_n during the past time t_m to the past time t_n are classified as the erroneous values to be eliminated or replaced with normal measured values (for example, replaced with the Wot_k which is the normal measured values of the original wind measured at the past time t_k which is before the past time t_m) and then the integrated operation is performed.

Figure 7B:
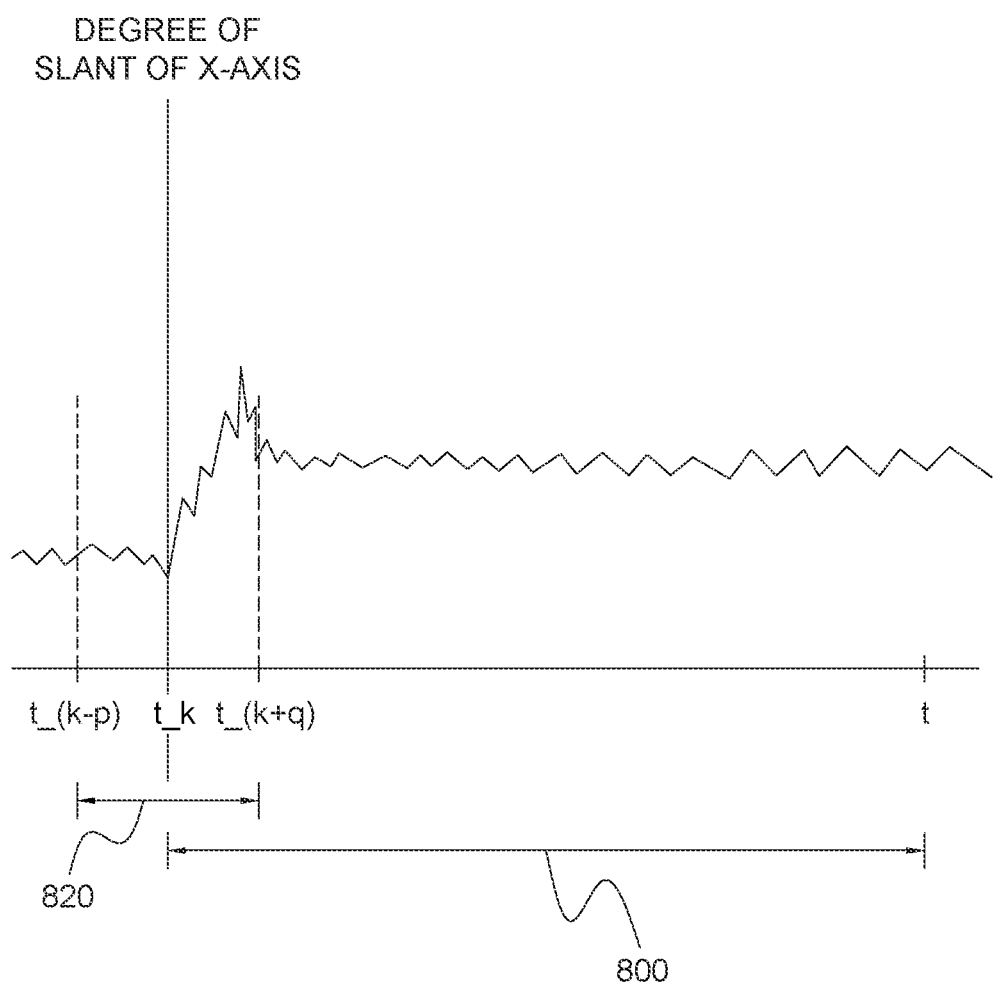
FIG. 7B is a graph illustrating, for at least one of the reference axes, a section where the change in the degree of slant happens and then the changed state is preserved, to be used for determining measured values in another section as erroneous values in accordance with one example embodiment of the present disclosure.

However, unlike FIG. 7A, FIG. 7B illustrates the change in the degree of slant being preserved for the accumulated measurement time after a change in the degree of slant that is equal to or larger than a first threshold happens.

FIG. 7B is a graph illustrating, for at least one of the reference axes, a section where the change in the degree of slant happens and then the changed state is preserved, to be used for determining measured values in another section as erroneous values in accordance with one example embodiment of the present disclosure.

Referring to FIG. 7B, the degree of slant of the vehicle 10 can be observed with reference to the X-axis 430 similarly to the FIG. 7A, and shows the change in the degree of slant occurred at the past time t_k, which is a time before the current time t, and preserved until the current time t. Herein, if a period of time 800 (e.g. 10 minutes) from the past time t_k to the current time t is assumed to be the accumulated measurement time, since the change in the degree of slant happens throughout the accumulated measurement time, it can be determined that the change in the degree of slant is caused by the slope of the road surface the vehicle 10 in travelling on and not because of the movement of the vehicle 10 (such that a sudden change in the degree of slant due to the slope of the road surface occurs at the past time t_k). Considering that the sudden change in the degree of slant that is equal to or larger than the first threshold may have a negative effect on a result of the integrated operation, an offsetting range may be set and its corresponding measured values may be classified as the erroneous values. That is, a Wot_(k−p), ..., a Wot(k−1), Wot_k, a Wot_(k+1), ..., a Wot_(k+q) measured during the offsetting range 820, from a past time t_(k−p) to a past time t_(k+q) are classified as erroneous values, to eliminate the erroneous values or replace the erroneous values with normal measured values measured right before or after thereof, (for example, the Wot_(k−p) of the past time t_(k−p) is replaced with normal measured values measured before the past time t_k to perform the integrated operation and improve an accuracy of the result).

Afterwards, in accordance with another example embodiment of the present disclosure, if a cardinal number of specific erroneous values whose corresponding changes in the degree of slant being equal to or larger than a second threshold is more than a predetermined percentage of a cardinal number of specific measured values measured at said every predetermined measurement interval during a specific accumulated measurement time, the true wind direction and true wind speed calculating device 100 performs a process of classifying the specific measured values as the erroneous values, and eliminate the erroneous values or replace the erroneous values with normal measured values measured right before or after thereof.

For example, if a change in the original wind measured for said every predetermined measurement interval for the accumulated measurement time of 10 minutes continues to occur with a large discrepancy (exceeding the second threshold), and if such a large discrepancy exceeds the predetermined percentage of the 600 measurements (e.g. 480, which is 80%), since the measured values in the corresponding accumulated measurement time may have a negative effect on an overall measurement result, all the measured values in the corresponding accumulated measurement time are classified as the erroneous values, to thereby acquire the final true wind direction and the final true wind speed after eliminating the erroneous values or replacing the erroneous values with normal measured values measured right before or after thereof.

The present disclosure has an effect of providing a method for correcting the observation errors due to the degree of slant of the vehicle by adjusting the reference axes to thereby adjust the measured values measured by the true wind direction and true wind speed calculating device 100.

The present disclosure has another effect of determining whether the vehicle is moving and accordingly performing additional error adjusting processes.

The present disclosure has still another effect of measuring the change in the degree of slant for each of the references axes, to thereby eliminate or replace measured values whose changes are equal to or larger than a specific threshold.

Besides, the embodiments of the present disclosure as explained above can be implemented in a form of executable program command through a variety of computer means recordable to computer readable media. The computer readable media may store solely or in combination, program commands, data files, and data structures. The program commands recorded in the media may be components specially designed for the present disclosure or may be usable for a skilled human in a field of computer software. The computer readable media include, but are not limited to, magnetic media such as hard drives, floppy diskettes, magnetic tapes, memory cards, solid-state drives, USB flash drives, optical media such as CD-ROM and DVD, magneto-optical media such as floptical diskettes and hardware devices such as a read-only memory (ROM), a random access memory (RAM), and a flash memory specially designed to store and carry out program commands. Program commands may include not only a machine language code made by a compiler but also a high level code that can be used by an interpreter etc., which is executed by a computer. The aforementioned hardware device may work as more than a software module to perform the action of the present disclosure and they may do the same in the opposite case. The hardware device may include a processor such as a CPU or a GPU, combined with a memory device such as ROM or RAM to store the program commands, configured to execute the commands stored in the memory, and a communication part which can exchange signals with external devices. In addition, the hardware device may include a keyboard, a mouse, and any other external input device to receive commands prepared by developers.

As seen above, the present disclosure has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for calculating a true wind direction and a true wind speed by adjusting measured values of an anemometer mounted on a vehicle based on observation errors caused by a degree of slant of the vehicle, comprising steps of:
   (a) a true wind direction and true wind speed calculating device on which an electronic compass module is mounted, wherein the electronic compass module is dependent on a degree of horizontality of the anemometer, and wherein the degree of horizontality is changed according to the degree of slant of the vehicle, performing a process of (I) acquiring a Gt, which is information on the degree of slant corresponding to a current time t, from the electronic compass module, wherein the Gt includes: (i) information on an angle θxt which is an angle of a Zt-axis being rotated from a Z-axis toward an X-axis and (ii) information on an angle θYt which is an angle of the Zt-axis being rotated from the Z-axis toward a Y-axis, wherein the Z-axis is an axis along which gravity acts on the vehicle, wherein the X-axis and the Y-axis included in an XY plane are respectively related to a first direction and a second direction, the XY plane containing current coordinates of a predetermined reference point of the vehicle, and wherein the Zt-axis corresponds to a vertical axis of the anemometer, and (II) acquiring a Wmt which is information on a measured wind measured by the anemometer at the current time t, wherein the Wmt includes measured values of the Zt-axis, an Xt-axis and a Yt-axis, wherein the Xt-axis in a third direction and the Yt-axis in a fourth direction forms an XtYt plane, and wherein the XtYt plane is perpendicular to the Zt-axis and includes the current coordinates of the vehicle; and
   (b) the true wind direction and true wind speed calculating device performing a process of acquiring a Wmt', which is information on a measured corrected wind in a space formed by the X-axis, the Y-axis, and the Z-axis after a first error correction on the Wmt by referring to the Gt, to thereby calculate a first true wind direction and a first true wind speed.

2. The method of claim 1, wherein the true wind direction and true wind speed calculating device includes a vehicle location module capable of acquiring information on the current coordinates of the vehicle, and based thereon, acquiring information on a speed of the vehicle, an acceleration of the vehicle, and a direction of the vehicle, and
   wherein, after the step of (b), the method further comprises steps of:
   (c) the true wind direction and true wind speed calculating device performing a process of determining whether the vehicle is moving by referring to at least one of the electronic compass module and the vehicle location module, wherein the electronic compass module contains an accelerometer capable of measuring a change in the acceleration of the vehicle; and
   (d) (1) in response to a determination that the vehicle is moving, the true wind direction and true wind speed calculating device performing a process of (i) (i–1) acquiring a piece of first vehicle information including (i–1–a) information on the speed of the vehicle, the acceleration of the vehicle and a true north of the vehicle, from the vehicle location module, and (i–1–b) information on a heading of the vehicle, from the electronic compass module, and (i–2) acquiring a Wct, which is information on a relative wind caused by the vehicle moving, based on the first vehicle information, (ii) calculating a Wct', which is information on a corrected relative wind in the space formed by the X-axis, the Y-axis, and the Z-axis after a second error correction on the Wct by referring to the Gt, and (iii) acquiring a first Wot, which is information on an original wind in the space formed by the X-axis, the Y-axis, and the Z-axis by referring to the first vehicle information, the Wmt', and the Wct', to thereby calculate a (2–1)-st true wind direction and a (2–1)-st true wind speed, (2) in response to a determination that the vehicle is not moving, the true wind direction and true wind speed calculating device performing a process of (i) acquiring a piece of second vehicle information, including information on the true north of the vehicle and the heading of the vehicle, from the electronic compass module, and (ii) acquiring a second Wot, which is information on an original wind in the space formed by the X-axis, the Y-axis, and the Z-axis by referring to the second vehicle information and the Wmt', to thereby calculate a (2–2)-nd true wind direction and a (2–2)-nd true wind speed, and (3) acquiring the true wind direction and the true wind speed on which a determination as to whether the vehicle is moving is additionally reflected by referring to the (2–1)-st true wind direction and the (2–1)-st true wind speed and the (2–2)-nd true wind direction and the (2–2)-nd true wind speed.

3. The method of claim 2, wherein the true wind direction and true wind speed calculating device calculates the (2–1)-st true wind direction and the (2–1)-st true wind speed or the (2–2)-nd true wind direction and the (2–2)-nd true wind speed at every predetermined measurement interval, and performing an integrated operation on the (2–1)-st true wind direction and the (2–1)-st true wind speed or the (2–2)-nd true wind direction and the (2–2)-nd true wind speed, to thereby acquire a final true wind direction and a final true wind speed as corresponding to an accumulated measurement time.

4. The method of claim 3, wherein, at the step of (d), in response to the determination that the vehicle is moving, (d1) the true wind direction and true wind speed calculating device performs a process of acquiring information on each change in the degree of slant for each of the X-axis, the Y-axis, and the Z-axis from the electronic compass module for a time period from a past time t_k to the current time t which corresponds to the accumulated measurement time, and (d2) in response to a detection on (i) a specific change in the degree of slant that is equal to or larger than a first threshold at a past time t_m, which is a time after the past time t_k, and then (ii) the specific change in the degree of slant is restored at a past time t_n, the true wind direction and true wind speed calculating device performs a process of classifying the first Wot, which are a Wot_m to a Wot_n measured during the past time t_m to the past time t_n at said every predetermined measurement interval as erroneous values, to thereby acquire the final true wind direction and the final true wind speed after eliminating the erroneous values or after replacing the erroneous values with normal measured values measured right before or after thereof.

5. The method of claim 3, wherein, at the step of (d), in response to the determination that the vehicle is moving, (d1) the true wind direction and true wind speed calculating device performs a process of acquiring information on each change in the degree of slant for each of the X-axis, the Y-axis, and the Z-axis from the electronic compass module for a time period from a past time t_k to the current time t which corresponds to the accumulated measurement time, and (d2) in response to a detection on (i) a specific change in the degree of slant that is equal to or larger than a first threshold at the past time t_k, and then (ii) the specific change in the degree of slant is preserved until the current time t, the true wind direction and true wind speed calculating device performs a process of classifying a Wot_(k−p), . . . , a Wot(k−1), Wot_k, a Wot_(k+1), . . . , a Wot(k+q) measured during an offsetting range from a past time t_(k−p) to a past time t_(k+q) as erroneous values, to thereby acquire the final true wind direction and the final true wind speed after eliminating the erroneous values or replacing the erroneous values with normal measured values measured right before or after thereof.

6. The method of claim 3, wherein, in response to a detection on a cardinal number of specific erroneous values whose corresponding changes in the degree of slant being equal to or larger than a second threshold to be more than a predetermined percentage of a cardinal number of specific measured values measured at said every predetermined measurement interval during a specific accumulated measurement time, the true wind direction and true wind speed calculating device performs a process of classifying the specific measured values as the erroneous values, to thereby acquire the final true wind direction and the final true wind speed after eliminating the erroneous values or replacing the erroneous values with normal measured values measured right before or after thereof.

7. A true wind direction and true wind speed calculating device for calculating a true wind direction and a true wind speed by adjusting measured values of an anemometer mounted on a vehicle based on observation errors caused by a degree of slant of the vehicle, wherein the true wind direction and true wind speed calculating device includes an electronic compass module mounted thereon, wherein the electronic compass module is dependent on a degree of horizontality of the anemometer, and wherein the degree of horizontality is changed according to the degree of slant of the vehicle, comprising:

at least one memory that stores instructions; and at least one processor configured to execute the instructions to perform: (I) a process of (i) acquiring a Gt, which is information on the degree of slant corresponding to a current time t, from the electronic compass module, wherein the Gt includes: (i−1) information on an angle θxt which is an angle of a Zt-axis being rotated from a Z-axis toward an X-axis and (i−2) information on an angle θYt which is an angle of the Zt-axis being rotated from the Z-axis toward a Y-axis, wherein the Z-axis is an axis along which gravity acts on the vehicle, wherein the X-axis and the Y-axis included in an XY plane are respectively related to a first direction and a second direction, the XY plane containing current coordinates of a predetermined reference point of the vehicle, and wherein the Zt-axis corresponds to a vertical axis of the anemometer, and (ii) acquiring a Wmt which is information on a measured wind measured by the anemometer at the current time t, wherein the Wmt includes measured values of the Zt-axis, an Xt-axis and a Yt-axis, wherein the Xt-axis in a third direction and the Yt-axis in a fourth direction forms an XtYt plane, and wherein the XtYt plane is perpendicular to the Zt-axis and includes the current coordinates of the vehicle; and (II) a process of acquiring a Wmt', which is information on a measured corrected wind in a space formed by the X-axis, the Y-axis, and the Z-axis after a first error correction on the Wmt by referring to the Gt, to thereby calculate a first true wind direction and a first true wind speed.

8. The device of claim 7, wherein, the true wind direction and true wind speed calculating device includes a vehicle location module capable of acquiring information on the current coordinates of the vehicle, and based thereon, acquiring information on a speed of the vehicle, an acceleration of the vehicle, and a direction of the vehicle, wherein, after the process of (II), the processor further performs: (III) a process of determining whether the vehicle is moving by referring to at least one of the electronic compass module and the vehicle location module, wherein the electronic compass module contains an accelerometer capable of measuring a change in the acceleration of the vehicle; and (IV) (1) in response to a determination that the vehicle is moving, a process of (i) (i−1) acquiring a piece of first vehicle information including (i−1−a) information on the speed of the vehicle, the acceleration of the vehicle and a true north of the vehicle, from the vehicle location module, and (i−1−b) information on a heading of the vehicle, from the electronic compass module, and (i−2) acquiring a Wct, which is information on a relative wind caused by the vehicle moving, based on the first vehicle information, (ii) calculating a Wct', which is information on a corrected relative wind in the space formed by the X-axis, the Y-axis, and the Z-axis after a second error correction on the Wct by referring to the Gt, and (iii) acquiring a first Wot, which is information on an original wind in the space formed by the X-axis, the Y-axis, and the Z-axis by referring to the first vehicle information, the Wmt', and the Wct', to thereby calculate a (2–1)-st true wind direction and a (2–1)-st true wind speed, (2) in response to a determination that the vehicle is not moving, a process of (i) acquiring a piece of second vehicle information, including information on the true north of the vehicle and the heading of the vehicle, from the electronic compass module, and (ii) acquiring a second Wot, which is information on an original wind in the space formed by the X-axis, the Y-axis, and the Z-axis by referring to the second vehicle information and the Wmt', to thereby calculate a (2-2)-nd true wind direction and a (2-2)-nd true wind speed, and (3) a process of acquiring the true wind direction and the true wind speed on which a determination as to whether the vehicle is moving is additionally reflected by referring to the (2-1)-st true wind direction and the (2-1)-st true wind speed and the (2-2)-nd true wind direction and the (2-2)-nd true wind speed.

9. The device of claim 8, wherein, the processor performs a process of calculating the (2-1)-st true wind direction and the (2-1)-st true wind speed or the (2-2)-nd true wind direction and the (2-2)-nd true wind speed, and applying an integrated operation to the (2-1)-st true wind direction and the (2-1)-st true wind speed or the (2-2)-nd true wind direction and the (2-2)-nd true wind speed, to thereby acquire a final true wind direction and a final true wind speed as corresponding to an accumulated measurement time.

10. The device of claim 9, wherein at the process of (IV), in response to the determination that the vehicle is moving, the processor performs: (IV-1) a process of acquiring information on each change in the degree of slant for each of the X-axis, the Y-axis, and the Z-axis from the electronic compass module for a time period from a past time t_k to the current time t which corresponds to the accumulated measurement time, and (IV-2) in response to a detection on (i) a specific change in the degree of slant that is equal to or larger than a first threshold at a past time t_m, which is a time after the past time t_k, and then (ii) the specific change in the degree of slant is restored at a past time t_n, a process of classifying the first Wot, which are Wot_m to a Wot_n measured during the past time t_m to the past time t_n at said every predetermined measurement interval as erroneous values, to thereby acquire the final true wind direction and the final true wind speed after eliminating the erroneous values or after replacing the erroneous values with normal measured values measured right before or after thereof.

11. The device of claim 9, wherein at the process of (IV), in response to the determination that the vehicle is moving, the processor performs: (IV-1) a process of acquiring information on each change in the degree of slant for each of the X-axis, the Y-axis, and the Z-axis from the electronic compass module for a time period from a past time t_k to the current time t which corresponds to the accumulated measurement time, and (IV-2) in response to a detection on (i) a specific change in the degree of slant that is equal to or larger than a first threshold at the past time t_k, and then (ii) the specific change in the degree of slant is preserved until the current time t, a process of classifying a Wot_(k-p), ..., a Wot(k-1), Wot_k, a Wot_(k+1), a Wot(k+q) measured during an offsetting range from a past time t_(k-p) to a past time t_(k+q) as erroneous values, to thereby acquire the final true wind direction and the final true wind speed after eliminating the erroneous values or replacing the erroneous values with a normal measured values measured right before or after thereof.

12. The device of claim 9, wherein, in response to a detection on a cardinal number of specific erroneous values whose corresponding changes in the degree of slant being equal to or larger than a second threshold to be more than a predetermined percentage of a cardinal number of specific measured values measured at said every predetermined measurement interval during a specific accumulated measurement time, further performs a process of classifying the specific measured values as the erroneous values, to thereby acquire the final true wind direction and the final true wind speed after eliminating the erroneous values or replacing the erroneous values with a normal measured values measured right before or after thereof.

\* \* \* \* \*